(12) United States Patent
Abu-Saymeh

(10) Patent No.: US 12,390,755 B2
(45) Date of Patent: Aug. 19, 2025

(54) CLOGGED AIR FILTER DETECTION FOR GALLEY INSERTS

(71) Applicant: B/E Aerospace, Inc., Winston Salem, NC (US)

(72) Inventor: Mudar Abu-Saymeh, Olathe, KS (US)

(73) Assignee: B/E Aerospace Inc., Winston Salem, NC (US)

( * ) Notice: Subject to any disclaimer, the term of this patent is extended or adjusted under 35 U.S.C. 154(b) by 41 days.

(21) Appl. No.: 17/234,122

(22) Filed: Apr. 19, 2021

(65) Prior Publication Data

US 2022/0331729 A1 Oct. 20, 2022

(51) Int. Cl.
*B01D 46/00* (2022.01)
*B01D 46/42* (2006.01)
*B64D 13/06* (2006.01)
*F21V 33/00* (2006.01)

(52) U.S. Cl.
CPC ..... *B01D 46/0086* (2013.01); *B01D 46/0095* (2013.01); *B01D 46/42* (2013.01); *F21V 33/0064* (2013.01); *B64D 13/06* (2013.01); *B64D 2013/0651* (2013.01)

(58) Field of Classification Search
None
See application file for complete search history.

(56) References Cited

U.S. PATENT DOCUMENTS

| 3,691,736 A | * | 9/1972 | Neumann | B01D 46/023 |
| | | | | 55/504 |
| 4,808,234 A | * | 2/1989 | McKay | B01D 41/04 |
| | | | | 15/345 |
| 4,842,624 A | * | 6/1989 | Barton | B01D 41/04 |
| | | | | 55/293 |
| 5,311,023 A | * | 5/1994 | Means, Jr. | B01D 46/44 |
| | | | | 250/341.7 |
| 5,679,137 A | * | 10/1997 | Erdman | B03C 3/74 |
| | | | | 250/573 |

(Continued)

FOREIGN PATENT DOCUMENTS

| CN | 201071457 Y | * | 6/2008 | |
| CN | 105561686 A | * | 5/2016 | ............ B01D 46/00 |

(Continued)

OTHER PUBLICATIONS

Oct. 2019 PEG Appendix 1, USPTO, p. 20-29 https://web.archive.org/web/20230831224313/https://www.uspto.gov/sites/default/files/documents/peg_oct_2019_app1.pdf (Year: 2019).*

(Continued)

*Primary Examiner* — Brit E. Anbacht
(74) *Attorney, Agent, or Firm* — SNELL & WILMER L.L.P.

(57) ABSTRACT

An air filter health monitoring system includes a filter spanning an air passage for filtering solids and/or liquids out of an air flow passing through the air passage. An illuminator is positioned on a first side of the filter and directed to illuminate the filter. An illumination sensor is positioned on a second side of the filter. The illuminator and illumination sensor can each be spaced apart from the filter. The filter can be installed in a galley insert and can include a reticulated filter medium folded in a v-shape over a v-shaped grid work.

15 Claims, 2 Drawing Sheets

(56) References Cited

U.S. PATENT DOCUMENTS

| | | | | |
|---|---|---|---|---|
| 6,104,032 | A * | 8/2000 | Means | G01N 21/88 |
| | | | | 250/341.7 |
| 6,455,818 | B1 * | 9/2002 | Arntz | F24C 15/2042 |
| | | | | 126/299 R |
| 7,041,159 | B2 * | 5/2006 | Entezarian | F24C 15/2035 |
| | | | | 55/467 |
| 7,600,388 | B2 | 10/2009 | Vestal | |
| 7,947,101 | B2 * | 5/2011 | Devine | B01D 46/522 |
| | | | | 55/497 |
| 8,852,308 | B2 * | 10/2014 | Jarrier | B01D 46/121 |
| | | | | 55/497 |
| 10,639,577 | B1 | 5/2020 | Wilson, Jr. et al. | |
| 2004/0144254 | A1 * | 7/2004 | Wiser, III | B01D 46/10 |
| | | | | 55/482 |
| 2004/0187689 | A1 * | 9/2004 | Sporre | B01D 46/71 |
| | | | | 95/286 |
| 2006/0259273 | A1 * | 11/2006 | Goldberg | B01D 37/046 |
| | | | | 702/182 |
| 2007/0169448 | A1 * | 7/2007 | Osborne | B01D 24/00 |
| | | | | 55/484 |
| 2010/0313748 | A1 * | 12/2010 | Schluter | B01D 46/46 |
| | | | | 96/417 |
| 2012/0125592 | A1 * | 5/2012 | Fadell | B01D 46/0086 |
| | | | | 96/417 |
| 2013/0289919 | A1 * | 10/2013 | Wilson, Jr. | B01D 46/0086 |
| | | | | 356/51 |
| 2018/0031290 | A1 | 2/2018 | Ho et al. | |
| 2021/0055002 | A1 * | 2/2021 | Chartrel | F24C 15/2035 |
| 2021/0223616 | A1 * | 7/2021 | Song | G02F 1/133331 |

FOREIGN PATENT DOCUMENTS

| | | | | |
|---|---|---|---|---|
| CN | 109190221 B * | 1/2023 | | G06F 30/15 |
| DE | 3644045 A1 | 6/1988 | | |
| DE | 3716049 A1 | 11/1988 | | |
| DE | 10245911 A1 * | 4/2004 | | B01D 46/0086 |
| DE | 102019214732 A1 * | 4/2021 | | |
| EP | 2801773 A2 | 11/2014 | | |
| EP | 3018423 A1 | 5/2016 | | |
| WO | WO-9210268 A1 * | 6/1992 | | B01D 41/04 |
| WO | WO-03014838 A2 * | 2/2003 | | B01D 46/0086 |
| WO | WO-2018075002 A1 * | 4/2018 | | B01D 46/0086 |

OTHER PUBLICATIONS

Extended European Search Report for European Patent Application No. EP22168149.7, dated Aug. 18, 2022.
European Patent Office, European Office Action dated Jan. 8, 2024 in Application No. 22168149.7.
European Patent Office, European Office Action dated Aug. 7, 2024 in Application No. 22168149.7.

* cited by examiner

CLOGGED AIR FILTER DETECTION FOR GALLEY INSERTS

BACKGROUND

1. Field

This disclosure is directed generally to health monitoring, and more specifically to health monitoring for air filters in cooling systems.

2. Description of Related Art

In galley inserts, such as beverage coolers, other refrigeration systems, and ovens onboard aircraft, filter life is typically assumed. When the assumed useful life of a given filter has expired, the operator replaces the filter. However, the assumed life is inaccurate because of varying conditions from one filter to the next. As a result, filters are frequently discarded at a point in time where they are still useful.

The conventional techniques have been considered satisfactory for their intended purpose. However, there is an ever present need for systems and methods for improved tracking and management of filter life. This disclosure provides a solution for this need.

SUMMARY

An air filter health monitoring system includes a filter spanning an air passage for filtering solids and/or liquids out of an air flow passing through the air passage. An illuminator is positioned on a first side of the filter and directed to illuminate the filter. An illumination sensor is positioned on a second side of the filter. The illuminator and illumination sensor can each be spaced apart from the filter. The filter can be installed in a galley insert and can include a reticulated filter medium folded in a v-shape over a v-shaped grid work.

The illuminator can define a field of illumination, and the illumination sensor can be positioned within the field of illumination. The illumination sensor can define a field of regard, and the illuminator can be within the field of regard. The illuminator can be configured to illuminate in a range of wavelengths, and the illumination sensor can be sensitive to at least a portion of the range of wavelengths. The range of wavelengths can include infrared wavelengths.

A controller can be operatively connected to the illuminator and to the illumination sensor. The controller can include machine readable instructions configured to cause the controller to illuminate the first side of the filter with the illuminator, detect illumination from the illuminator passing through the filter with the illumination sensor on the second side of the illuminator, and determine health status of the filter.

The illuminator and the illumination sensor can be a first sensing pair of a plurality of sensing pairs, each including a respective illuminator on the first side of the filter optically coupled with a respective illumination sensor on the second side of the filter. The sensing pairs can be arrayed in a pattern configured to detect area effects in the filter.

The controller can be operatively connected to the illuminator and illumination sensor array. The controller can include machine readable instructions configured to cause the controller to, illuminate the first side of the filter with the illuminators, detect illumination from the respective illuminator passing through the filter with each respective illumination sensor on the second side of the illuminator, determine health status of the filter as an area phenomenon.

The area phenomenon can include a percentage of area of the filter that is still has useful life, and the controller can include machine readable instructions configured to output to a display the percentage of area to a user. The machine readable instructions can also include instructions that cause the controller to trigger an alert to a user when a certain area amount of the filter is clogged and/or to make a prediction of when the filter will need replacement, and to display output to a user the prediction.

A method comprises monitoring health of a filter based on detecting illumination passing through the filter. Monitoring includes determining a percentage of area of the filter that has remaining useful life. The method can further include displaying the percentage of area to a user, displaying output indicative of a prediction of when the filter will need to be replaced, and/or alerting a user when a certain area amount of the filter is clogged.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
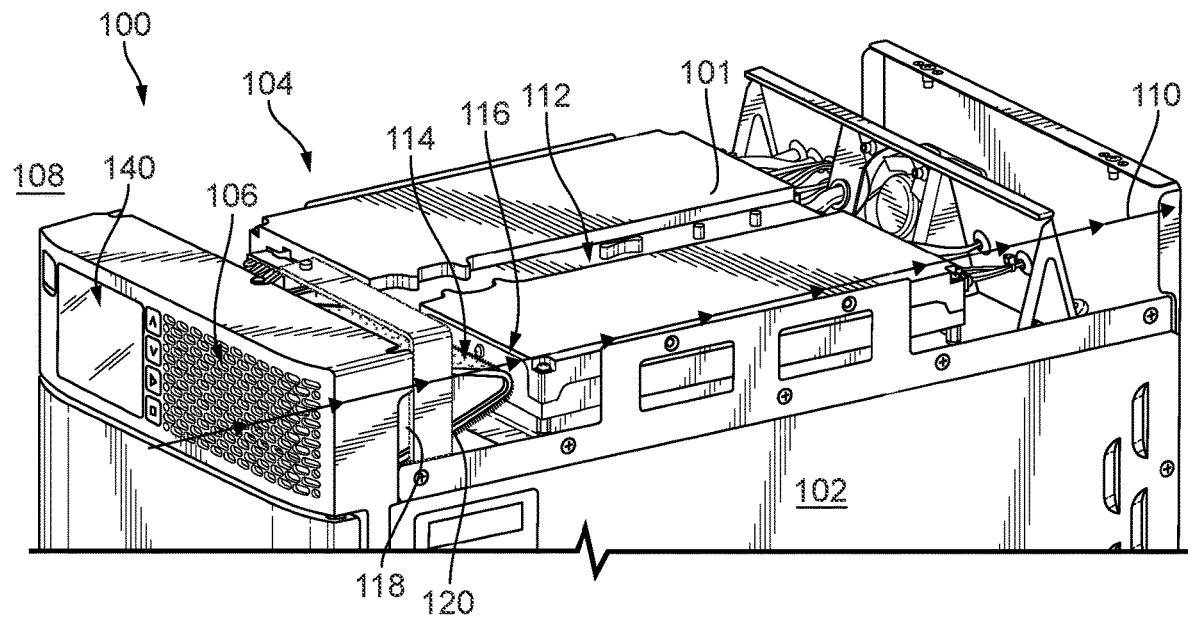
FIG. 1 is a schematic perspective view of an embodiment of a galley insert constructed in accordance with the present disclosure, showing an air filter having a health monitoring system.
Figure 2:
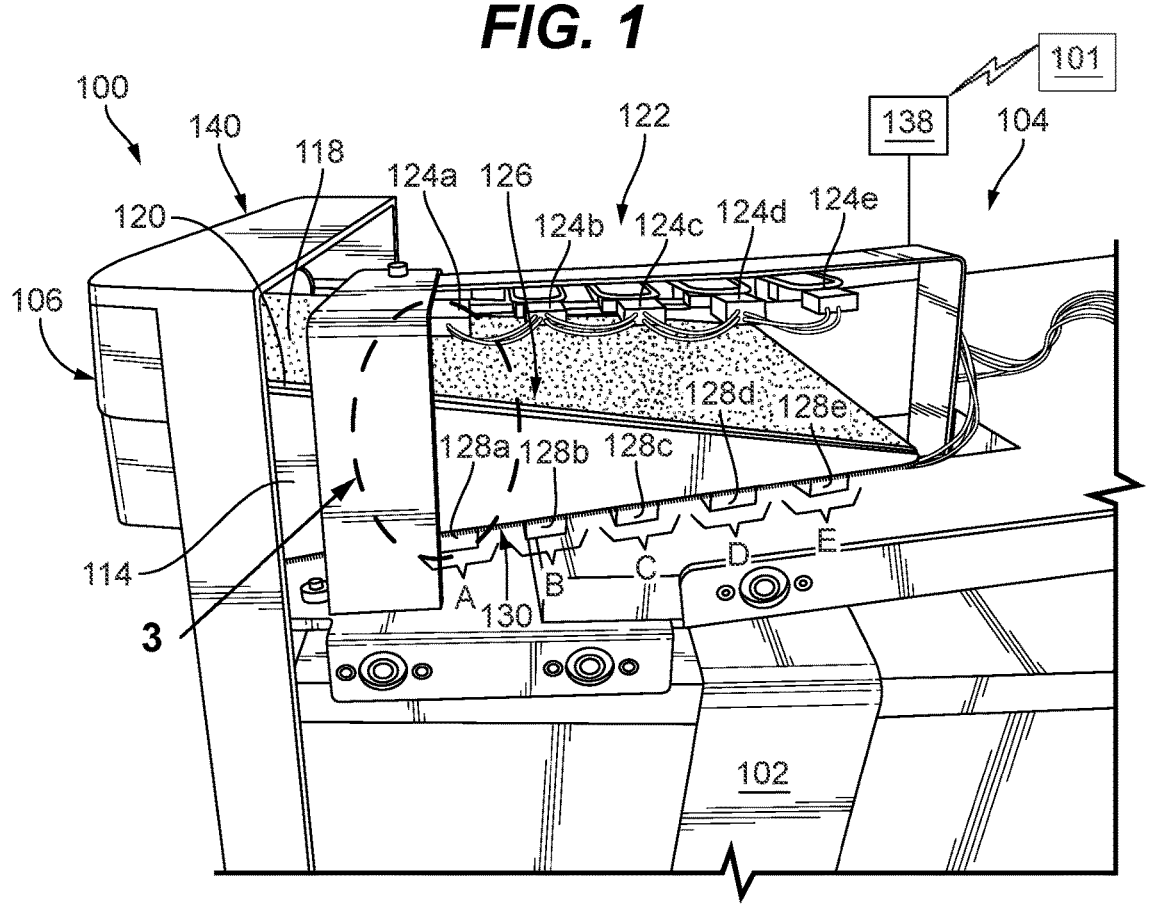
FIG. 2 is a schematic side view of the health monitoring system of FIG. 1.
Figure 3:
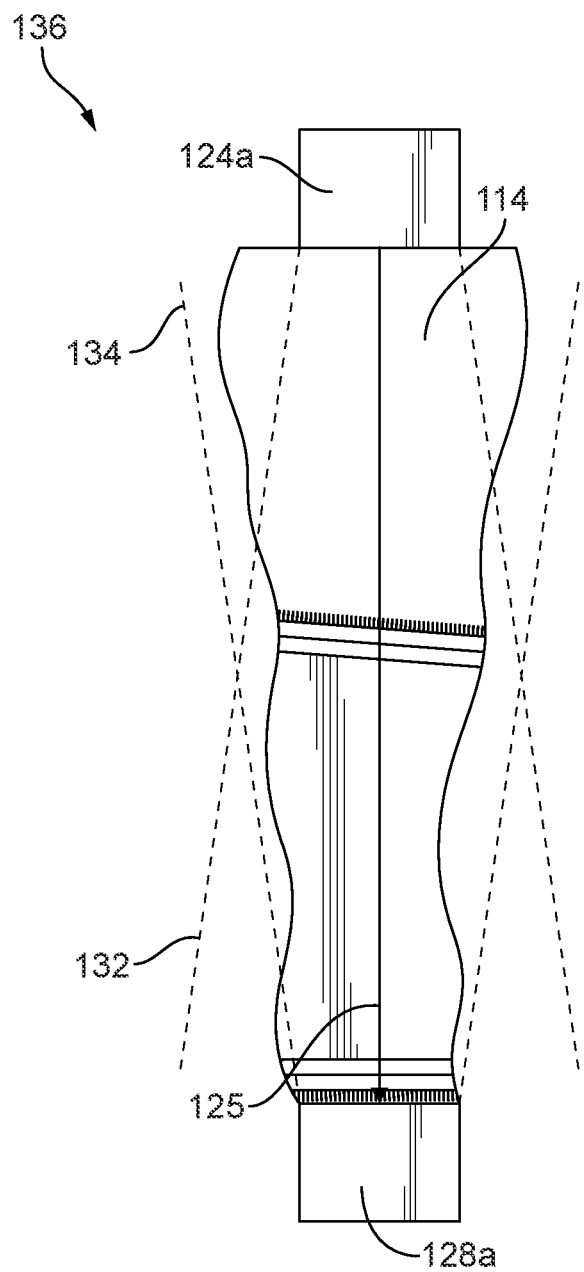
FIG. 3 is an enlarged partial view of the health monitoring system of FIG. 2.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to improve air filter maintenance.

A galley insert 100 (e.g an oven, beverage cooler, chiller, chiller system, or the like), can comprise a main interior space 102 and an auxiliary cavity 104, for example for housing electronics. The insert 100 can include an air passage 106 for receiving ambient air from an ambient space 108 outside of the insert 100, into the interior of the auxiliary cavity 104 (e.g. arrow 110), for example for cooling components 112 within the auxiliary cavity 104. An air filter 114 may be situated on an interior side 116 of the air inlet 106, spanning air passage 106, for filtering solids, liquids, or other particles out of air flow 110 passing through the air passage 106. The filter 114 can include a reticulated filter medium 118 folded in a v-shape over a v-shaped grid work 120.

An air filter health monitoring system 122 can be included in the insert 100, for example on the air filter 114 for monitoring flow through the air filter 114. An illuminator 124 can be positioned on a first side 126 of the filter 114 directed to illuminate the filter 114, and an illumination sensor 128 is positioned on a second side 130 of the filter 114. The illuminator 124 and illumination sensor 128 can each be spaced apart from the filter 114 so as not to obstruct flow 107 through the filter 114. It is contemplated that illuminator 124 and illumination sensor 128 can be positioned on the same side of the filter 114, while a reflective surface can be positioned on an opposite side of the filter 114 to reflect the illumination 125 into sensor 128.

The illuminator 124 can define a field of illumination 132 and the illumination sensor 128 is positioned within the field of illumination 132, such that illumination 125 from the illuminator 124 passing through the filter 114 is incident on the illumination sensor 128. Similarly, the illumination sensor 128 can define a field of regard 134 and the illuminator 124 can be within the field of regard 134 such that illumination 125 from the illuminator 125 passing through the filter 114 is incident on the illumination sensor 128. In embodiments, the illuminator 124 can be configured to illuminate in a range of wavelengths, and the illumination sensor 128 can be sensitive to at least a portion of the range of wavelengths. For example, the range of wavelengths can include infrared wavelengths.

The illuminator 124 and the illumination sensor 128 can be a first sensing pair 136a of a plurality of sensing pairs 136a-136e. The plurality of sensing pairs 136 can be arrayed in a pattern configured to detect area effects in the filter 114, for example areas A-E, however any suitable arrangement may be used.

A controller 138 can be operatively connected to a respective illuminator 124 and illumination sensor 128, or the controller 138 can be operatively connected to the sensor array 136. The controller 138 can include machine readable instructions configured to cause the controller to illuminate the first side 126 of the filter with the illuminators 128, detect illumination 117 from the respective illuminator 124 passing through the filter 114 with each respective illumination sensor 128 on the second side of the illuminator 130, and determine health status of the filter 114 as an area phenomenon.

For example, the area phenomenon can include a percentage of area of the filter 114 that is still has useful life. More specifically, the sensor array 136 can monitor and determine the health status of the filter 114 by monitoring each area independently. The controller can include machine readable instructions configured to output health information (e.g. the percentage of area experiencing decreased air flow) to a display 140 for view by a user 101. The display 140 can include, for example, a human machine interface included on the insert 100, or a personal electronic device receiving health information through an application. The controller 138 can be configured to trigger an alert 142 to the user 101 when a certain area amount of the filter 114 is clogged or is about to be clogged, and alert the user to the specific area of the filter 114. Additionally or alternatively, the controller 138 can be configured to make a prediction of when the filter 114 will need replacement, and to display the prediction output to the user 101.

A method comprises monitoring the health of the filter 114 based on detecting illumination 125 passing through the filter 114. Monitoring the health of the filter 114 can include determining a percentage of area of the filter 114 that has remaining useful life. The method can further include displaying (e.g. on display 140) the percentage of area to the user 101, displaying output indicative of a prediction of when the filter 114 will need to be replaced, and/or alerting the user 101 when a certain area amount of the filter 114 is clogged.

Conventionally, galley inserts such as refrigeration units or ovens used on commercial aircraft rely on an air filters to prevent fine particles from clogging the condensing unit. A clogged condensing unit can result in degraded performance of the insert and a reduction in its useful life. Typically, the air filter is recommended to be replaced after a set interval of operating hours, however, this approach is inaccurate as operating environment varies and it does not provide a means to predict filter blockage for scheduled maintenance.

Because replacing filters for galley inserts is conventionally performed off wing, performing such maintenance can be expensive. So replacing filters that are not due to be replaced increases costs. The methods and systems of the present disclosure, as described above and shown in the drawings, provide for accurate measurement of filter health without tracking operating hours. Further, galley insert operators (e.g. flight crew) or other end users can schedule a maintenance activity ahead of time when filter blockage percentage is known, removing guesswork so that filters are replaced when needed. Moreover, a properly maintained clean air filter improves products performance and reliability and can reduce warranty costs. While the apparatus and methods of the subject disclosure have been shown and described, those skilled in the art will readily appreciate that changes and/or modifications may be made thereto without departing from the scope of the subject disclosure.

What is claimed is:

1. An air filter health monitoring system comprising:
 a filter, located on an interior side of an air inlet, spanning an air passage for filtering solids and/or liquids out of an air flow passing through the air passage, wherein air from an exterior ambient space enters the air inlet and is filtered through the filter before passing into an auxiliary cavity;
 an illuminator positioned on a first side of the filter, directed to illuminate the filter;
 an illumination sensor positioned on a second side of the filter, wherein the illuminator and the illumination sensor are a first sensing pair of a plurality of sensing pairs, each including a respective illuminator on the first side of the filter optically coupled with a respective illumination sensor on the second side of the filter, and the sensing pairs are arrayed in a pattern configured to detect area effects in the filter; and
 a controller operatively connected to the illuminator and to the illumination sensor, wherein the controller includes machine readable instructions configured to cause the controller to:
  illuminate the first side of the filter with the illuminators;
  detect an illumination from the respective illuminator passing through the filter with each respective illumination sensor;
  determine health status of the filter as an area phenomenon based on the illumination, wherein the area phenomenon includes a percentage of area of the filter that still has useful life; and
  output health information to a display, the health information comprising the percentage of area.

2. The system as recited in claim 1, wherein the illuminator is configured to illuminate in a range of wavelengths, and wherein the illumination sensor is sensitive to at least a portion of the range of wavelengths.

3. The system as recited in claim 2, wherein the range of wavelengths includes infrared wavelengths.

4. The system as recited in claim 3, wherein the illuminator defines a field of illumination, and wherein the illumination sensor is positioned within the field of illumination.

5. The system as recited in claim 4, wherein the illumination sensor defines a field of regard, and wherein the illuminator is within the field of regard.

6. The system as recited in claim 5, wherein the machine readable instructions include instructions that cause the controller to trigger an alert to a user when a certain area amount of the filter is clogged.

7. The system as recited in claim 5, wherein the machine readable instructions include instructions that cause the controller to make a prediction of when the filter will need replacement, and to display output to a user the prediction.

8. The system as recited in claim 1, wherein the filter is installed in a galley insert.

9. The system as recited in claim 5, wherein the illuminator and illumination sensor are each spaced apart from the filter.

10. The system as recited in claim 1, wherein the filter includes a reticulated filter medium folded in a v-shape over a v-shaped grid work.

11. The system as recited in claim 1, wherein the health information further comprises a percentage of area of the filter experiencing decreased air flow and a replacement time prediction.

12. The system as recited in claim 1, wherein the machine readable instructions further cause the controller to output to a display the percentage of area experiencing decreased air flow to a user to alert a user as to when parts of the filter need to be replaced.

13. The system as recited in claim 1, further comprising:
the first sensing pair of the plurality of sensing pairs configured to monitor a first area of the filter; and
the second sensing pair of the plurality of sensing pairs configured to monitor a second area of the filter independently of the first sensing pair.

14. The system as recited in claim 9, wherein each illuminator is oriented to direct the illumination substantially perpendicular with respect to a direction of the air flow passing through the passage.

15. The system as recited in claim 14, wherein the filter is oriented at a non-orthogonal angle with respect to the air flow passing through the passage.

* * * * *